Patented Apr. 16, 1935

1,998,101

UNITED STATES PATENT OFFICE 1,998,101

SECONDARY-AMYL ALLYL BARBITURIC ACIDS AND SALTS

Horace A. Shonle, Indianapolis, Ind., assignor to Eli Lilly and Company, Indianapolis, Ind., a corporation of Indiana No Drawing. Application February 15, 1932, Serial No. 593,201

5 Claims. (Cl. 260—33)

This application is a continuation in part of my copending application Serial No. 387,084, filed August 19, 1929.

It is the main object of my invention to produce certain 5,5-di-aliphatic-substituted barbituric acids, and their salts, in which one substituent is the allyl group, and the other substituent is a saturated secondary-aliphatic radical, open chain or cyclic, having five carbon atoms, including the following groups:

Propyl-methyl-carbinyl (or 1-methyl-butyl);
Di-ethyl-carbinyl (or 1-ethyl-propyl);
Isopropyl-methyl-carbinyl (or 1-methyl-isobutyl);
Cyclo-pentyl.

An incidental object of my invention is to produce certain new intermediates. These are mainly certain di-aliphatic-substituted malonic esters; but I have also produced certain new mono-aliphatic-substituted malonic esters and barbituric acids and barbiturates.

The new 5,5-di-aliphatic-substituted barbituric acids and their salts which are included in this present application all have pronounced hypnotic action. They are all represented by the following formula:

(1) 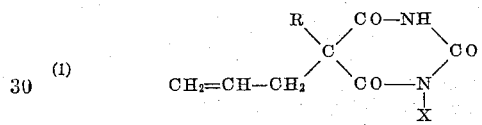

in which R represents a saturated secondary-aliphatic radical, open-chain or cyclic, having 5 carbon atoms; and X represents either hydrogen (if the compound is an acid) or either an alkali metal, such as sodium, or its equivalent of an alkaline-earth metal, such as magnesium, or ammonium, or a mono- or di-alkyl-substituted ammonium, such as —NH₃—CH₃ or —NH₂(C₂H₅)₂, (if the compound is a salt).

These new acids and salts are prepared from certain mono-substituted or di-substituted malonic esters, usually ethyl esters, which are represented by the following formula:

(2) 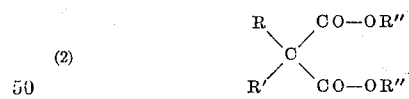

in which R, as before, represents a saturated secondary-aliphatic radical, open chain or cyclic, having 5 carbon atoms; R' represents hydrogen or the allyl group according to whether the ester is a mono-substituted or a di-substituted ester; and R'' represents an alkyl radical having not to exceed three carbon atoms, namely the methyl, ethyl, and propyl radicals, and preferably the ethyl radical.

The new di-aliphatic-substituted esters are represented by the following formula:

(3) 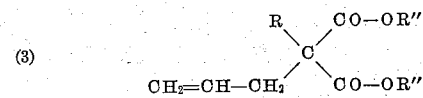

in which R and R'' have the significance already defined.

The new di-substituted malonic esters, barbituric acids, and barbiturates constitute a class the members of which have in common a radical (4) 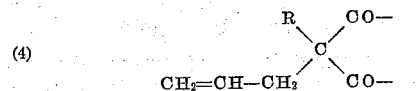

in which R, as already defined, represents a saturated secondary-aliphatic radical, open chain or cyclic, having 5 carbon atoms, and in which the two CO groups are joined to the chemical structure necessary to make the whole a compound of that class.

So far as I know, I am the first to produce any compound containing the radical shown in Formula 4.

*Mono-aliphatic-substituted malonic esters*

Four of these are involved.

1. Propyl-methyl-carbinyl malonic ester (also called 1-methyl-butyl malonic ester) may be prepared as follows: 1 mole of sodium is dissolved in 10 to 12 times its weight of absolute alcohol under a reflux condenser. To this are added 1 mole of malonic ester, and then gradually 1.1 moles of 2-bromo-pentane (obtained by refluxing propyl-methyl carbinol with HBr). The mixture is gently refluxed for some hours, or until it no longer shows an alkaline reaction to moist litmus paper. Most of the alcohol is removed by vacuum distillation, leaving an oily residue. Water is added to the residue to dissolve the sodium bromide; and the oily layer, which is propyl-methyl-carbinyl malonic ester, is separated and dried. It is purified by fractional distillation in vacuo. When thus purified, propyl-methyl-carbinyl malonic ester is a colorless or pale yellow liquid, having a boiling point of 103–105° C. at about 4 mm. pressure, and a refractive index at 25° C. of about 1.4255 to 1.4263. It is represented by the following formula:

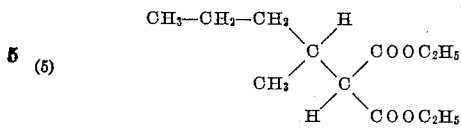
(5)

2. Di-ethyl-carbinyl malonic ester (also called 1-ethyl-propyl malonic ester) may be prepared analogously to propyl-methyl-carbinyl malonic ester, using 3-bromo-pentane (obtained by refluxing di-ethyl carbinol with HBr). When so prepared it is a colorless or pale yellow liquid, which when purified by fractional distillation in vacuo has a boiling point of 100–103° C. at about 3 mm. pressure, and a refractive index at 25° C. of about 1.4256 to 1.4266. It is represented by the following formula:

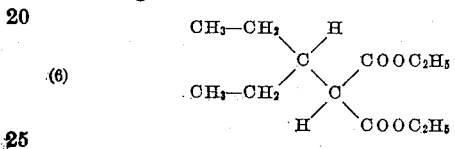
(6)

It is described more in detail in my co-pending application, Serial No. 676,539, filed June 19, 1933.

3. Isopropyl-methyl-carbinyl malonic ester (also called 1-methyl-isobutyl malonic ester) may also be prepared analogously to propyl-methyl-carbinyl malonic ester, using 3-bromo-2-methyl butane (obtained by treating isopropyl-methyl carbinol with dry HBr). It is a colorless or pale yellow liquid, having a high boiling point. It is represented by the following formula:

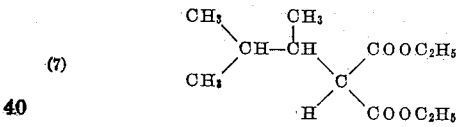
(7)

4. Cyclo-pentyl malonic ester is prepared analogously to propyl-methyl-carbinyl malonic ester, using cyclo-pentyl bromide (obtained by refluxing cyclo-pentanol with HBr). It is a colorless or pale yellow liquid, having when purified by fractional distillation in vacuo a boiling point of 113–115° C. at about 4 mm. pressure, and a refractive index at 25° C. of about 1.4420 to 1.4435. It is represented by the following formula:

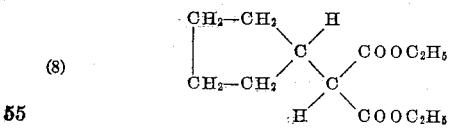
(8)

*Di-aliphatic-substituted malonic esters*

The four di-aliphatic-substituted malonic esters involved may be prepared by a process similar to that described for the preparation of the mono-aliphatic-substituted malonic esters. That is, they are prepared by refluxing slightly in excess of one mole of the desired aliphatic bromide with one mole of sodium allyl malonic ester in absolute alcohol until the reaction mixture is no longer alkaline, removing the alcohol by distillation, washing the sodium bromide from the residual ester with water, drying, and purifying the ester by fractional distillation in vacuo. As the preparation of the specific di-substituted malonic esters thus corresponds closely to that of the corresponding mono-substituted malonic esters, save for the use of sodium allyl malonic ester in the place of sodium malonic ester, it is unnecessary to repeat the details of the procedure, and it is sufficient to give characteristics of the four esters.

1. Propyl-methyl-carbinyl allyl malonic ester (also called allyl 1-methyl-butyl malonic ester) is a colorless or pale yellow liquid, having a boiling point of about 95° C. at about 1 mm. pressure, and a refractive index at 20° C. of approximately 1.4450. It is represented by the following formula:

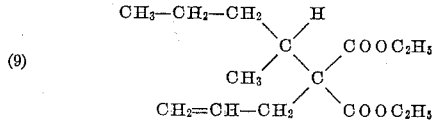
(9)

2. Di-ethyl-carbinyl allyl malonic ester (also called allyl 1-ethyl-propyl malonic ester) is a colorless or pale yellow liquid, having a high boiling point. It is represented by the following formula:

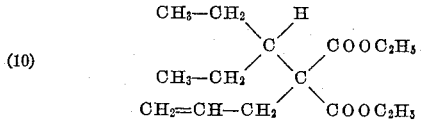
(10)

3. Isopropyl-methyl-carbinyl allyl malonic ester (also called allyl 1-methyl-isobutyl malonic ester) is a colorless or pale yellow liquid, having a high boiling point. It is represented by the following formula:

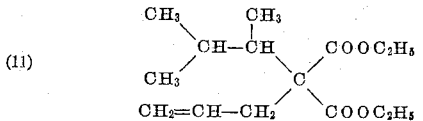
(11)

4. Cyclo-pentyl allyl malonic ester is a colorless or pale yellow liquid, having a high boiling point. It is represented by the following formula:

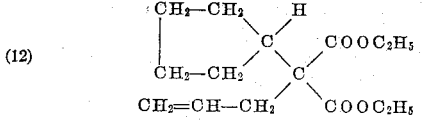
(12)

*Mono-aliphatic-substituted barbituric acids*

There are four of these.

1. Propyl-methyl-carbinyl barbituric acid (also called 1-methyl-butyl barbituric acid) may be prepared as follows: 3 moles of sodium are dissolved in 10 to 12 times its weight of absolute alcohol under a reflux condenser. To this are added 1.6 moles of urea and 1 mole of propyl-methyl-carbinyl malonic ester. The mixture is gently refluxed for 2 to 4 hours, after which most of the alcohol is removed by vacuum distillation. The residue is dissolved in water, and a sufficient amount of dilute acid is added to completely precipitate the propyl-methyl-carbinyl barbituric acid. The precipitate is filtered off, dried, and recrystallized from dilute alcohol.

Propyl-methyl-carbinyl barbituric acid is a crystalline solid, which after a recrystallization melts at 164–166° C., corrected. It is soluble in alcohol and ether, and insoluble in petroleum ether. It dissolves in aqueous solutions of the hydroxides of the alkali metals. It is represented by the following formula:

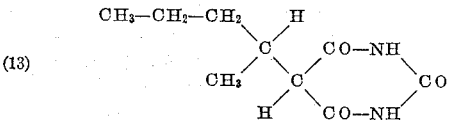
(13)

Its potassium and sodium salts are both white solids, readily soluble in water, and insoluble in ether.

2. Di-ethyl-carbinyl barbituric acid (also called 1-ethyl-propyl barbituric acid) is prepared analogously to propyl-methyl-carbinyl barbituric acid, using di-ethyl-carbinyl malonic ester. It is a crystalline solid. It is soluble in alcohol and ether, and insoluble in petroleum ether. It dissolves in aqueous solutions of the hydroxides of the alkali metals. It is represented by the following formula:

(14) 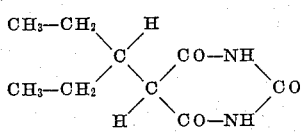

Its potassium and sodium salts are both white solids, readily soluble in water, and insoluble in ether. This acid and its salts are described more in detail in my copending application Serial No. 676,539, filed June 19, 1933.

3. Isopropyl-methyl-carbinyl barbituric acid (also called 1-methyl-isobutyl barbituric acid) may be prepared analogously to propyl-methyl-carbinyl barbituric acid, using isopropyl-methyl-carbinyl malonic ester. It is a white crystalline solid, soluble in alcohol and ether, and insoluble in petroleum ether. It dissolves in aqueous solutions of the hydroxides of the alkali metals. It is represented by the following formula:

(15) 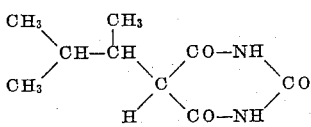

Its potassium and sodium salts are both white solids, readily soluble in water, and insoluble in ether.

4. Cyclo-pentyl barbituric acid may be prepared analogously to propyl-methyl-carbinyl barbituric acid, using cyclo-pentyl malonic ester. It is a crystalline solid, melting at 221–223° C., corrected. It is soluble in alcohol and ether, and insoluble in petroleum ether. It dissolves in aqueous solutions of the hydroxides of the alkali metals. It is represented by the following formula:

(16) 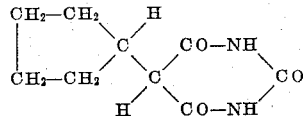

Its potassium and sodium salts are both white solids, readily soluble in water, and insoluble in ether.

*Di-aliphatic-substituted barbituric acids*

The four 5,5-di-aliphatic-substituted barbituric acids involved may be prepared by either of two methods:

A. In the first method, the necessary mono-aliphatic-substituted barbituric acid, prepared as already described, is caused to react with allyl bromide in the presence of alkali:

1. Propyl-methyl-carbinyl allyl barbituric acid (also called allyl 1-methyl-butyl barbituric acid) may be prepared as follows: 1 mole of propyl-methyl-carbinyl barbituric acid is dissolved in a suitable vessel in a 25 to 35% aqueous solution of one mole of potassium hydroxide. To this are added somewhat in excess of one mole of allyl bromide, and alcohol equal to about 10% of the total volume of the solution. The vessel is agitated for 50–75 hours. At the end of this time, the solution, which still exhibits two layers, is concentrated to about one-half its volume, to remove the excess allyl bromide and the alcohol. On cooling, an oily layer, which is propyl-methyl-carbinyl allyl barbituric acid, separates out as a sticky viscous mass. It is dried, washed with petroleum ether, and dissolved in the minimum amount of benzene. Any unreacted propyl-methyl-carbinyl barbituric acid, which does not dissolve, is filtered off. The addition of petroleum ether to the clear filtrate causes the propyl-methyl-carbinyl allyl barbituric acid to precipitate as an oily mass. This is separated, washed with petroleum ether, and dried in vacuo. After some time it hardens into a whitish solid having a melting point of 80–83° C. On some further recrystallization from dilute alcohol, it shows a melting point of 91–93.5° C., corrected. It is represented by the following formula:

(17) 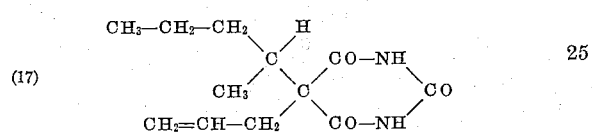

By causing a reaction of this acid with an alkali-metal hydroxide or ethylate, or with an alkaline-earth hydroxide, or with an organic amine, the corresponding salt may be obtained. When pure, the sodium salt is a white solid, readily soluble in water and alcohol but insoluble in ether; the magnesium salt is a white crystalline solid, somewhat soluble in water and ether; and the mono-methyl-amine salt is a yellowish solid, soluble in water. The preferred method for obtaining the pure salts is described hereinafter.

Specific claims to propyl-methyl-carbinyl allyl barbituric acid and its salts are presented in my co-pending application Serial No. 707,781, filed January 22, 1934.

2. Di-ethyl-carbinyl allyl barbituric acid (also called allyl 1-ethyl-propyl barbituric acid) may be prepared analogously to propyl-methyl-carbinyl allyl barbituric acid, using di-ethyl-carbinyl barbituric acid instead of propyl-methyl-carbinyl barbituric acid for the reaction with allyl bromide. It is a difficultly crystallizable material, and is usually obtained as a viscous sticky mass by precipitating it from a benzene solution by the addition of petroleum ether. It is represented by the following formula:

(18) 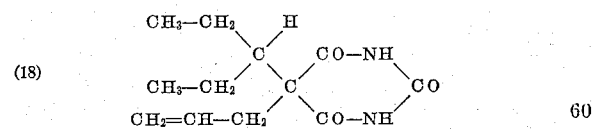

Its sodium salt, which may be prepared analogously to the sodium salt of propyl-methyl-carbinyl allyl barbituric acid, is a white solid, readily soluble in water and alcohol but insoluble in ether.

Specific claims to di-ethyl-carbinyl allyl barbituric acid and its salts are presented in my co-pending application Serial No. 676,539, filed June 19, 1933.

3. Isopropyl-methyl-carbinyl allyl barbituric acid (also called allyl 1-methyl-isobutyl barbituric acid) may also be prepared analogously to propyl-methyl-carbinyl allyl barbituric acid; by causing a reaction of isopropyl-methyl-carbinyl barbituric acid with allyl bromide in the presence of alkali.

It is a difficultly crystallizable solid. It is represented by the following formula:

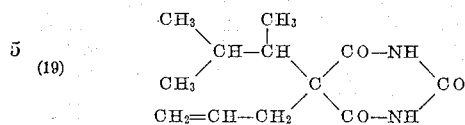
(19)

Its sodium salt, which may be prepared analogously to the sodium salt of propyl-methyl-carbinyl allyl barbituric acid, is a white solid, readily soluble in water and alcohol but insoluble in ether.

4. Cyclo-pentyl allyl barbituric acid may also be prepared analogously to propyl-methyl-carbinyl allyl barbituric acid; by causing a reaction of cyclo-pentyl barbituric acid with allyl bromide in the presence of alkali. It is a white crystalline solid, having a melting point of about 162–164° C., corrected. It is represented by the following formula:

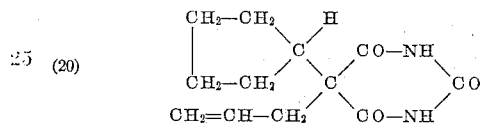
(20)

Its sodium salt, which may be prepared analogously to the sodium salt of propyl-methyl-carbinyl allyl barbituric acid, is a white solid, readily soluble in water and alcohol but insoluble in ether.

B. In the second method of producing these di-aliphatic-substituted barbituric acids, the di-aliphatic-substituted malonic ester corresponding to the desired barbituric acid is caused to react with urea in the presence of sodium ethylate.

1. Propyl-methyl-carbinyl allyl barbituric acid may be prepared as follows. Three moles of sodium are dissolved in 10 or 12 times its weight of absolute alcohol under a reflux condenser. To this are added 1.6 moles of urea and one mole of propyl-methyl-carbinyl allyl malonic ester. The mixture is gently refluxed for twelve to fifteen hours, after which most of the alcohol is removed by vacuum distillation. The residue is dissolved in water, and a sufficient amount of dilute acid is added to completely precipitate the propyl-methyl-carbinyl allyl barbituric acid. The precipitate is filtered off, dried, washed with gasoline, and purified by recrystallizing from dilute alcohol or by precipitating from acetone solution with gasoline.

2. Di-ethyl-carbinyl allyl barbituric acid may be prepared analogously to propyl-methyl-carbinyl allyl barbituric acid, using di-ethyl-carbinyl allyl malonic ester as the ester.

3. Isopropyl-methyl-carbinyl allyl barbituric acid may also be prepared analogously to propyl-methyl-carbinyl allyl barbituric acid, using isopropyl-methyl-carbinyl allyl malonic ester as the ester.

4. Cyclo-pentyl allyl barbituric acid may also be prepared analogously to propyl-methyl-carbinyl allyl barbituric acid, using cyclo-pentyl allyl malonic ester as the ester.

The di-aliphatic-substituted barbituric acids shown in Formulas 17 to 20 all react with alkali-metal hydroxides or ethylates, or with alkaline-earth hydroxides, or with amines, such as mono-ethyl or di-ethyl amine, to form the corresponding barbiturates of the inorganic or organic base used.

These di-aliphatic-substituted barbituric acids and their salts are of value as sedatives and hypnotics.

*Di-aliphatic-substituted barbiturates*

These new barbiturates, which may all be represented by Formula 1 with X representing a metal, or ammonium, or an alkyl-substituted ammonium, can perhaps best be prepared from the corresponding barbituric acids, as by reaction in a suitable solvent with either the hydroxide or the ethylate of the desired inorganic base, or with ammonia, or with the desired alkyl amine. For instance:

A. A solution of one molar proportion of the hydroxide or the ethylate of the inorganic base, such as sodium if an alkali-metal salt is desired, is added to a suspension or solution in a suitable solvent (such as water, dilute alcohol, or absolute alcohol) of one molar proportion of any of the herein-contemplated 5,5-di-aliphatic-substituted barbituric acids, producing the desired barbiturate in the solution. The amount of solvent used is desirably sufficient to dissolve the salt thus produced. The solution is filtered, and is then evaporated, preferably under vacuum at a low temperature, until the salt is obtained in solid form. If the salt is desired in a stable form sufficiently free from contaminants so that clear water solutions thereof suitable for intravenous injection may be obtained, such a salt may be so obtained by the method set forth in my Patent No. 1,856,792, granted May 3, 1932.

*Examples under A*

1. Sodium propyl-methyl-carbinyl allyl barbiturate: One part by weight of propyl-methyl-carbinyl allyl barbituric acid is added to enough alcohol to facilitate handling—in this case conveniently about six times its weight. To this is added a solution of sodium hydroxide, preferably carbonate-free or substantially so, containing $$\frac{40}{238}$$

parts by weight of sodium hydroxide, which is the amount of sodium hydroxide necessary to combine in equal molecular proportions with the propyl-methyl-carbinyl allyl barbituric acid. This solution is filtered clear, and is then evaporated under vacuum until the sodium-propyl-methyl-carbinyl allyl barbiturate (alternatively named sodium allyl 1-methyl-butyl barbiturate) separates out in solid form. The salt as thus obtained in solid form contains a varying amount of moisture.

If it is desired to have a stable salt substantially free from contaminants, the alcohol used for dissolving the barbituric acid is absolute alcohol, and the sodium hydroxide is added as a very concentrated aqueous solution so that the reaction which occurs to form the salt is in a substantially alcoholic solution. By having a substantially alcoholic solution, decomposition of the salt during the process of drying is effectively avoided; and the drying may be carried to a point where materially less than 1% of moisture remains, so that the salt is substantially anhydrous. In this way a stable salt substantially free from decomposition products formed during preparation or drying or on standing is obtained. This salt may be used safely for making aqueous solutions for intravenous injection; for such aqueous solutions, when freshly made, are clear solutions substantially free from haziness.

Sodium propyl-methyl-carbinyl allyl barbiturate is a white hygroscopic solid, readily soluble in water and alcohol, and insoluble in ether. When CO₂ is bubbled through an aqueous solution of it as concentrated as 5%, a precipitate of propyl-methyl-carbinyl allyl barbituric acid occurs. The salt is bitter tasting, and its aqueous solution is alkaline in reaction. The aqueous solution of this salt is not stable, but decomposes on standing. This salt is represented by the following formula:

(21) 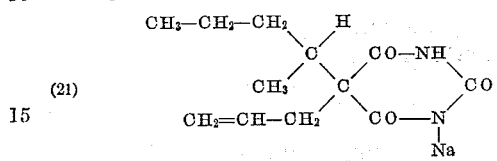

Sodium propyl-methyl-carbinyl allyl barbiturate is claimed specifically in my aforesaid co-pending application Serial No. 707,781.

The sodium salts of the other three barbituric acids may be prepared analogously, either in hydrated or in stable anhydrous form as desired. They are represented by the following formulas:

2. Sodium di-ethyl-carbinyl allyl barbiturate (also called sodium ally 1-ethyl-propyl barbiturate):

(22) 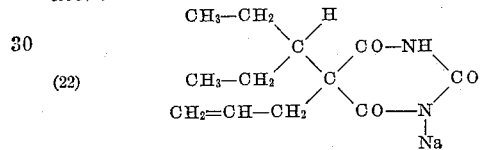

Sodium di-ethyl-carbinyl allyl barbiturate is claimed specifically in my aforesaid co-pending application Serial No. 676,539.

3. Sodium isopropyl-methyl-carbinyl allyl barbiturate (also called sodium allyl 1-methyl-isobutyl barbiturate):

(23) 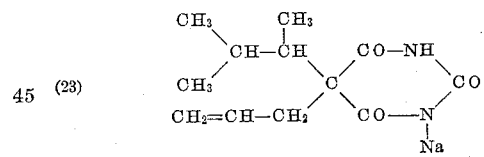

4. Sodium cyclo-pentyl barbiturate:

(24) 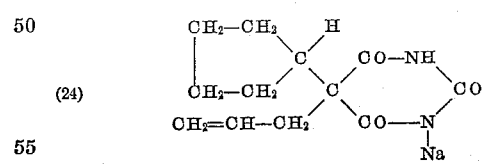

B. One molar proportion of any of the herein contemplated 5,5-di-aliphatic-substituted barbituric acids is dissolved in or added to somewhat more than a molar proportion of concentrated aqueous ammonia solution, and the resulting ammonium salt crystallizes out or is concentrated to solid form.

*Example under B*

Ammonium propyl-methyl-carbinyl allyl barbiturate:

One part by weight of powdered propyl-methyl-carbinyl allyl barbituric acid is added to somewhat more than a molecular proportion of concentrated aqueous ammonia solution. The barbituric acid dissolves on stirring, forming a thick syrupy solution of ammonium propyl-methyl-carbinyl allyl barbiturate. On standing the salt crystallizes out in solid form, and the excess ammonia and water may be volatilized by a current of air or by placing under vacuum, leaving the ammonium propyl-methyl-carbinyl allyl barbiturate in solid form. Too prolonged exposure to air or vacuum causes a loss of ammonia from the salt, leaving the salt mixed with the free acid.

Ammonium propyl-methyl-carbinyl allyl barbituric acid is a white solid, soluble in alcohol and water. Its aqueous solutions have an alkaline reaction. It is represented by the following formula:

(25) 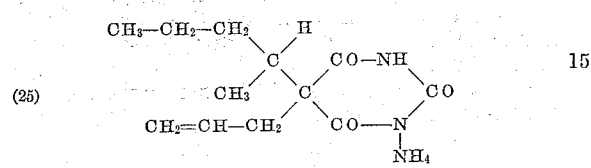

The ammonium salts of the other three di-substituted barbituric acids may be prepared analogously.

C. One molar proportion of any of the herein contemplated 5,5-di-aliphatic-substituted barbituric acids is added to somewhat more than a molar proportion of an alkyl amine, such as mono- or di-methyl amine or mono- or di-ethyl amine, in aqueous or alcoholic solution if desired or necessary. The amount of liquid used should be sufficient to ensure complete reaction. The resulting alkyl-substituted-ammonium barbiturate crystallizes out or is concentrated to solid form.

*Example under C*

An amine salt of cyclo-pentyl allyl barbituric acid:

One part by weight of powdered cyclo-pentyl allyl barbituric acid is added to more than a molecular proportion of mono-methyl amine, conveniently about 1.5 parts of a 30% solution. The barbituric acid dissolves on stirring, forming a thick syrupy solution of the mono-methyl amine salt of cyclo-pentyl allyl barbituric acid. On evaporation, preferably in vacuo, the salt separates out in solid form. Too prolonged exposure to vacuum causes a loss of mono-methyl amine, leaving the salt mixed with the free acid.

The mono-methyl amine salt of cyclo-pentyl allyl barbituric acid is a whitish solid, soluble in alcohol and water. Its aqueous solutions have an alkaline reaction. It is represented by the following formula:

(26) 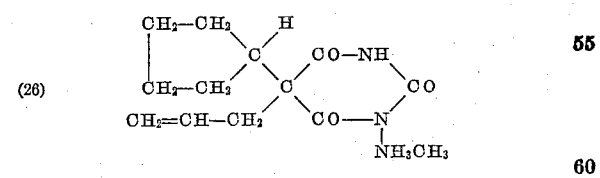

The amine salts of the other three di-substituted barbituric acids may be prepared analogously.

I claim as my invention:

1. A barbituric compound which is represented by the following formula:

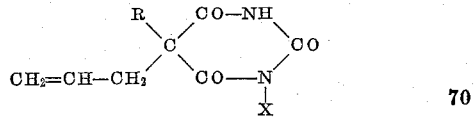

in which R represents a saturated secondary-aliphatic radical, open chain or cyclic, having five carbon atoms; and X represents either hydrogen, an alkali metal, an equivalent of an alkaline-earth metal, ammonium, or a mono- or di-alkyl-substituted ammonium.

2. A barbituric compound which is represented by the following formula:

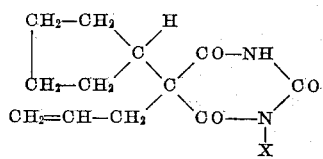

in which X represents either hydrogen, an alkali metal, an equivalent of an alkaline-earth metal, ammonium, or a mono- or di-alkyl-substituted ammonium.

3. A barbituric acid which is represented by the following formula:

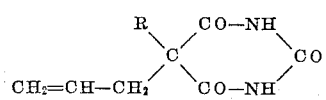

in which R represents a saturated secondary-aliphatic radical, open chain or cyclic, having five carbon atoms.

4. Cyclo-pentyl allyl barbituric acid, which is represented by the following formula:

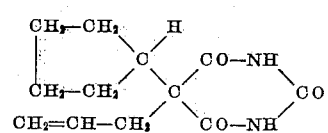

5. A sodium barbiturate which is represented by the following formula:

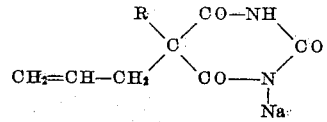

in which R represents a saturated secondary-aliphatic radical, open chain or cyclic, having five carbon atoms.

HORACE A. SHONLE.